(12) United States Patent
Hörger et al.

(10) Patent No.: US 8,653,799 B2
(45) Date of Patent: Feb. 18, 2014

(54) MULTILEVEL CONVERTER AS REACTIVE POWER COMPENSATOR HAVING ACTIVE

(75) Inventors: Wolfgang Hörger, Hausen (DE); Wolfgang Meusel, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 407 days.

(21) Appl. No.: 13/141,795

(22) PCT Filed: Nov. 16, 2009

(86) PCT No.: PCT/EP2009/065222
§ 371 (c)(1),
(2), (4) Date: Jun. 23, 2011

(87) PCT Pub. No.: WO2010/076079
PCT Pub. Date: Jul. 8, 2010

(65) Prior Publication Data
US 2011/0260701 A1 Oct. 27, 2011

(30) Foreign Application Priority Data
Dec. 29, 2008 (EP) .................................... 08022511

(51) Int. Cl.
*G05F 1/70* (2006.01)
(52) U.S. Cl.
USPC .......................................... 323/207; 323/205
(58) Field of Classification Search
USPC ............ 323/205, 207; 363/39, 40, 43, 71, 95, 363/97; 307/105
See application file for complete search history.

(56) References Cited

U.S. PATENT DOCUMENTS

| | | | |
|---|---|---|---|
| 5,148,361 A | 9/1992 | Braun et al. | H02M 7/48 |
| 5,648,894 A | 7/1997 | Dedoncker et al. | 363/39 |
| 6,075,350 A * | 6/2000 | Peng | 323/207 |
| 2008/0174183 A1 | 7/2008 | Seki | 307/105 |

FOREIGN PATENT DOCUMENTS

| | | | |
|---|---|---|---|
| EP | 0471107 A1 | 2/1992 | H02J 3/26 |
| WO | 2005/029669 A2 | 3/2005 | H02J 3/00 |

OTHER PUBLICATIONS

Chinese Office Action, Application No. 200980153058.7, 9 pages, May 2, 2013.

(Continued)

*Primary Examiner* — Adolf Berhane
*Assistant Examiner* — Yemane Mehari
(74) *Attorney, Agent, or Firm* — King & Spalding L.L.P.

(57) ABSTRACT

A multilevel converter has a plurality of converter strands, which are connected to the phases of a three-phase-network in a star or delta connection. From phase voltage values and phase current values, an active component characteristic of the overall active current and two asymmetrical components characteristic of a distribution of the overall flowing active and reactive currents are determined. The active and the two asymmetrical components are each filtered and multiplied with the phase voltage values and the two filtered asymmetrical components. The multiplied values are then weighed and added to the phase current values. From the asymmetrical components and the phase voltage values, a zero current is determined and added to the phase current values such that it symmetrizes a potential asymmetrical active current flow that would occur without the zero current. From the modified phase current values, a control state for the converter strands is determined.

17 Claims, 2 Drawing Sheets

(56) References Cited

OTHER PUBLICATIONS

"Koordinatentransformationen für Mehrgrößen-Regelsysteme zur Kompensation und Symmetrierung von Drehstromnetzen" von W. Meusel und H. Waldmann; Sonderdruck aus: Siemens Forsch.- u. Entwickl.-Ber., Vo. 6, 1977, No. 1, p. 29-38, Springer-Verlag Berlin. (11 pages).

Peng F Z et al: "A Universal STATCOM with Delta-Connected Cascade Multilevel Inverter", Jun. 20, 2004, p. 3529-3533, XP010738277. (5 pages).

Perez et al: "Analysis of a Multi-Cell Converter under Unbalanced AC Source", Jan. 1, 2005, p. 1011-1017, XP031000280. (7 pages).

Betz R E et al: "Symmetry Compensation using a H-Bridge Multilevel STATCOM with Zero Sequence Injection", Oct. 1, 2006; p. 1724-1731, XP031026255. (8 pages).

Search Report and Written Opinion for EP Application No. 08022511.3. (12 pages), Jul. 14, 2009.

International Search Report and Written Opinion for Application No. PCT/EP2009/065222. (14 pages), Dec. 11, 2009.

\* cited by examiner

FIG 2

MULTILEVEL CONVERTER AS REACTIVE POWER COMPENSATOR HAVING ACTIVE

CROSS-REFERENCE TO RELATED APPLICATIONS

This application is a U.S. National Stage Application of International Application No. PCT/EP2009/065222 filed Nov. 16, 2009, which designates the United States of America, and claims priority to EP Application No. 08022511.3 filed Dec. 29, 2008, the contents of which are hereby incorporated by reference in their entirety.

TECHNICAL FIELD

The present invention relates to an operating method for a multilevel converter which has a number of converter phases which are connected to the phases of a three-phase network in a star or delta connection.

The present invention also relates to a computer program which comprises a machine code which can be processed directly by a control device for the converter phases of a multilevel converter and the processing of which by the control device causes the control device to carry out such an operating method.

The present invention also relates to a control device for a number of converter phases of a multilevel converter which are connected to the phases of a three-phase network in a star or delta connection.

Finally, the present invention relates to a multilevel converter which has a number of converter phases which are connected to the phases of a three-phase network in a star or delta connection, wherein the multilevel converter also has a control device.

BACKGROUND

Multilevel converters are generally known. They are used, inter alia, as reactive power compensators for non-linear loads. The load can be, for example, a three-phase electric arc furnace. However, other loads are also possible. Purely by way of example, with respect to the configuration and with respect to the basic mode of operation of a multilevel converter used as a reactive power compensator, reference is made to U.S. Pat. No. 6,075,350 A.

By means of the procedure known from U.S. Pat. No. 6,075,350 A, it is already possible to ensure that disruptive harmonics and reactive power components are filtered out. However, the procedure in U.S. Pat. No. 6,075,350 A is technically very complex. Furthermore, the known procedure cannot ensure that the desired active power is distributed uniformly among all the phases of the three-phase network.

The specialist paper "A Universal STATCOM with Delta-Connected Cascade Multilevel Inverter" by F. Z. Peng et al., 35th Annual IEEE Power Electronics Specialists Conference, Aachen, Germany, 2004 discloses performing both reactive power compensation and active power symmetrization in a multilevel converter.

A similar disclosure can be found in the specialist paper "Symmetry Compensation using a H-Bridge Multilevel STATCOM with Zero Sequence Injection" by R. E. Betz et al., Conference Records of the 42nd IEEE Industry Applications Conference, October 2006, pages 1721 to 1731.

A power converter for a motor, which is operated with an unbalanced AC power source and supplies the motor with current in a uniform fashion, is known from the specialist paper "Analysis of a Multi-Cell Converter under Unbalanced AC Source" by M. A. Perez et al., 36th Power Electronics Specialists Conference, Piscataway, N.J., USA, 2005.

US 2008/174183 A1 discloses compensating harmonics in the current and/or voltage of a three-phase current system.

WO 2005/029669 A2 discloses filtering harmonics and reactive currents as well as symmetrizing the active power in a three-phase current system by means of an active filter.

U.S. Pat. No. 5,648,894 A discloses compensating harmonics and load asymmetries in a three-phase current system.

SUMMARY

According to various embodiments, possible ways of easily determining the actuation state of the multilevel converter and of distributing the active power uniformly among all the phases of the three-phase network can be provided.

According to an embodiments, in an operating method for a multilevel converter which has a number of converter phases which are connected to the phases of a three-phase network in a star or delta connection,—an active component and at least two asymmetrical components are determined on the basis of phase voltage values and phase current values,—the phase voltage values are characteristic of the phase voltages present at the phases and the phase current values are characteristic of the phase currents flowing in the phases,—the active component is characteristic of the total active current flowing in the three-phase network, and the at least two asymmetrical components are characteristic of a distribution, among the phases, of the total active and reactive currents flowing,—the active component and the at least two asymmetrical components are filtered with one filter characteristic each,—the phase voltage values are each multiplied by the filtered active component and the at least two filtered asymmetrical components,—the multiplied phase voltage values are each multiplied by a respective weighting factor and are then added to the phase current values,—a zero current is determined on the basis of the asymmetrical components and the phase voltage values and is also added to the phase current values,—wherein the zero current is determined in such a way that it symmetrizes any asymmetrical active power flux of the multilevel converter which would occur without the zero current, and—wherein an actuation state for the converter phases is determined on the basis of the phase current values which are modified in such a way, and the converter phases are actuated in accordance with the actuation state which is determined.

According to a further embodiment, the filter characteristics for the at least two asymmetrical components can be determined in such a way that a reduction in flickering, which occurs even without the filtering, is enhanced. According to a further embodiment, the filter characteristics for the at least two asymmetrical components may differ from the filter characteristic for the active component. According to a further embodiment, at least one adaptation factor can be determined on the basis of an instantaneous charge state of the converter phases, on the basis of which adaptation factor at least one of the filter characteristics and/or at least one of the weighting factors are/is adapted. According to a further embodiment, at least one of the multiplied phase voltage values and/or the zero current can be filtered before the addition to the phase current values by means of a respective adaptation filter which has an integrating behavior in the vicinity of the network frequency.

According to another embodiment, a computer program may comprise a machine code which can be processed directly by a control device for the converter phases of a multilevel converter and the processing of which by the control device causes the control device to carry out an operating method as described above.

According to a further embodiment of the computer program, the computer program can be stored on a data carrier in a machine-readable form.

According to another embodiment, a control device for a number of converter phases of a multilevel converter which are connected to the phases of a three-phase network in a star or delta connection, can be embodied in such a way that during operation it carries out an operating method as described above.

According to a further embodiment of the control device, the control device can be embodied as a software-programmable control device, and in that the control device is programmed with a computer program as described above.

According to yet another embodiment, a multilevel converter may have a number of converter phases which are connected to the phases of a three-phase network in a star or delta connection, wherein the multilevel converter has a control device, and wherein the control device can be embodied as described above.

BRIEF DESCRIPTION OF THE DRAWINGS

Further advantages and details emerge from the following description of exemplary embodiments in conjunction with the drawings, in which, in a basic illustration.

DETAILED DESCRIPTION

According to various embodiments, an active component and at least two asymmetrical components are determined on the basis of phase voltage values and phase current values. The phase voltage values are characteristic of the phase voltages present at the phases. The phase current values are characteristic of the phase currents flowing in the phases. The active current component is characteristic of the total active current flowing in the three-phase network. The at least two asymmetrical components are characteristic of a distribution, among the phases, of the total active and reactive currents flowing. The active current component and the at least two asymmetrical components are filtered with one filter characteristic each. The phase voltage values are each multiplied by the filtered active component and the at least two filtered asymmetrical components. The multiplied phase voltage values are each multiplied by a respective weighting factor and are then added to the phase current values. A zero current is determined on the basis of the asymmetrical components and the phase voltage values and is also added to the phase current values. The zero current is determined in such a way that it symmetrizes any asymmetrical active power flux of the multilevel converter which would occur without the zero current. On the basis of the phase current values which are modified in such a way, an actuation state for the converter phases is determined. The converter phases are actuated in accordance with the actuation state which is determined.

On the basis of the manner of determining the actuation state according to various embodiments, it is possible to ensure that both harmonics and rapidly or slowly changing reactive power components or power components which change to a high degree and which cause flickering are filtered out and that the phases of the three-phase network are uniformly loaded with active power and the converter phases nevertheless remain charged.

Fundamentally, the operating method according to various embodiments consists in firstly completely predefining the load current to be compensated as a set point value for the multilevel converter. However, the load current components are modified in the way explained above according to various embodiments, with the result that even asymmetrical current components can be distributed uniformly among all the phases of the three-phase network and, in order to avoid overloading of the multilevel converter, the load current components are subtracted from the current set point value taking into account a rate of change which avoids flickering. The symmetrization of the active load is carried out by means of an asymmetrical reactive load. For this purpose, the zero current is calculated, filtered and added to all the phase current set point values.

According to one embodiment of the operating method there is provision that the filter characteristics for the at least two asymmetrical components are determined in such a way that a reduction in flickering, which occurs even without the filtering, is enhanced. As a result, undesired network reactions can be minimized.

The filter characteristics for the at least two asymmetrical components are generally the same as one another. However, they can differ from the filter characteristic for the active component. This makes it possible in particular to optimize the charge state of the converter phases independently of the reduction in flickering.

In a further embodiment, there is provision that at least one adaptation factor is determined on the basis of an instantaneous charge state of the converter phases, on the basis of which adaptation factor at least one of the filter characteristics and/or at least one of the weighting factors are/is adapted. In this way, when a critical charge state has been reached it is possible to accelerate the correction of this charge state.

According to a further embodiment of the operating method, at least one of the multiplied phase voltage values and/or the zero current are/is filtered before the addition to the phase current values by means of a respective adaptation filter which has an integrating behavior in the vicinity of the network frequency. This permits a differentiating behavior of the feeding three-phase network to be easily compensated. As a result, a flickering effect can be reduced even further.

According to further embodiment, in a computer program of the type described above, the processing of which computer program may cause the control device to carry out an operating method according to other embodiments. The computer program can be stored on a data carrier in a machine-readable form. The data carrier can be embodied, in particular, as a mobile data carrier.

According to yet other embodiments, a control device of the type mentioned at the beginning can be embodied in such a way that during operation it carries out an operating method according to various embodiments. In many cases, the control device is embodied as a software-programmable controller. In this case, the control device is programmed with a computer program according to various embodiments.

In the multilevel converter according to various embodiments there is provision that the control device is embodied in such a way that during operation it carries out an operating method according to various embodiments.

Figure 1:
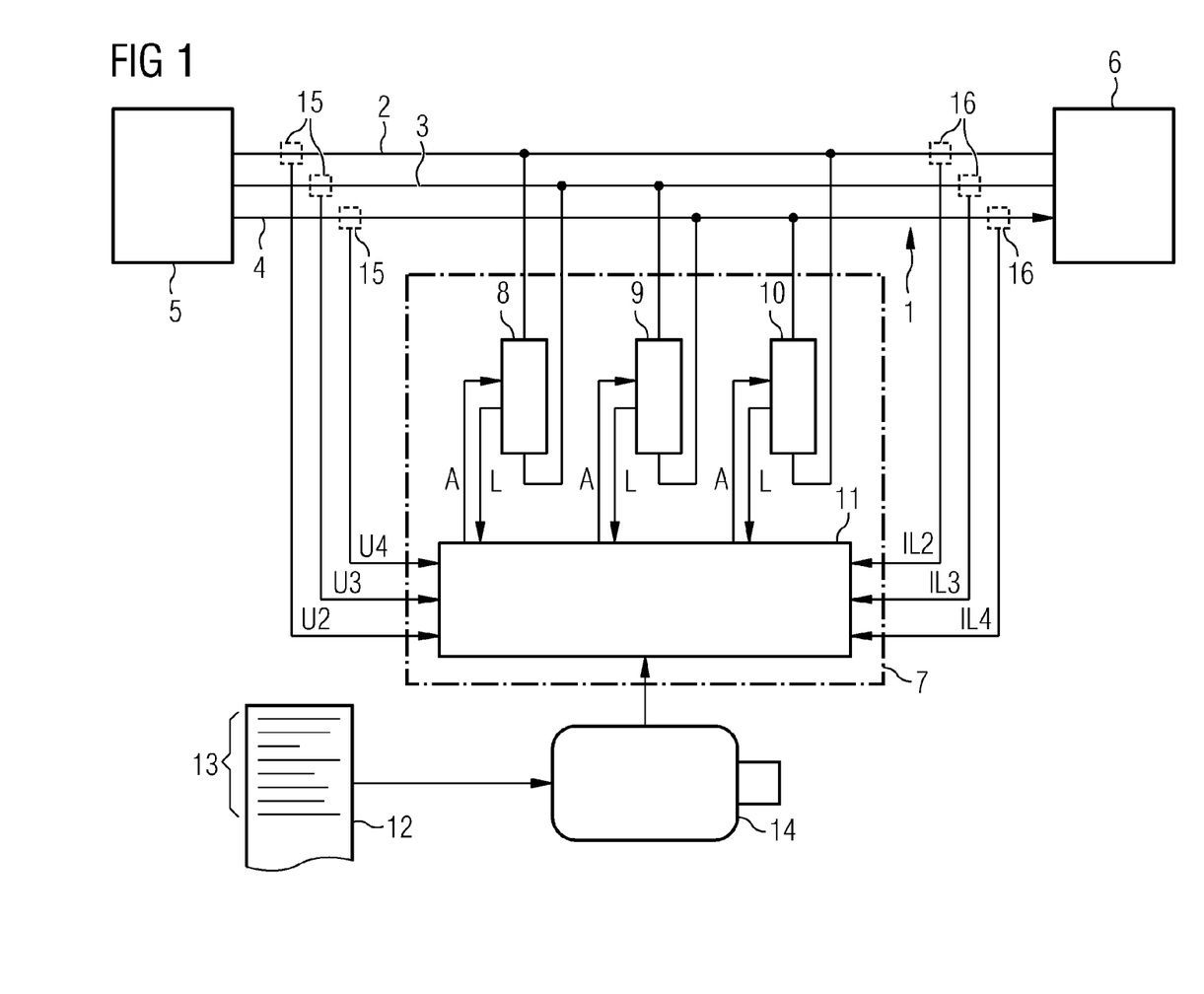
FIG. 1 is a schematic view of a three-phase current system.

According to FIG. 1, a three-phase network 1 has a plurality of phases 2 to 4. Three such phases 2 to 4 are illustrated in FIG. 1. The number of phases 2 to 4 could, however, also be greater, for example five. The three-phase network 1 is fed from a feeding point 5. The feeding point 5 can, for example, be a three-phase current transformer. A load 6 is connected to the three-phase network 1. The load 6 can be embodied, for example, as a three-phase electric arc furnace or as some other load which is markedly nonlinear.

If the load 6 were operated straight away on the three-phase network 1, strong network reactions would result. A reactive power compensator 7 is therefore connected in parallel with the load 6. The reactive power compensator 7 is embodied according to various embodiments as a multilevel converter 7.

The multilevel converter 7 has a number of converter phases 8 to 10. Each converter phase 8 to 10 has a series circuit composed of individually invertible voltage sources. The number of voltage sources per converter phase 8 to 8 can be selected as required. As a rule, the number is between 10 and 100. By all events it is considerably greater than two. The basic design of the converter phases 8 to 10 is described in detail in the above-mentioned U.S. Pat. No. 6,075,350 A, and there is therefore no need for detailed statements relating to the design of the individual converter phases 8 to 10.

According to FIG. 1, each converter phase 8 to 10 is connected to, in each case, two of the phases 2 to 4. The converter phases 8 to 10 are therefore connected in a delta connection to the phases 2 to 4 of the three-phase network 1. Alternatively, the converter phases 8 to 10 could be connected in a star connection to the phases 2 to 4 of the three-phase network 1.

The multilevel converter 7 also has a control device 11. The control device 11 receives state signals U2 to U4, IL2 to IL4 of the three-phase network 1. Said control device 11 determines an actuation state A for the converter phases 8 to 10 on the basis of the supplied state signals U2 to U4, IL2 to IL4 of the three-phase network 1. The actuation state A comprises, for each individual voltage source of each converter phase 8 to 10, the binary individual actuation state (+/−) thereof or the ternary individual actuation state (+/0/−) thereof.

The control device 11 can be implemented using circuitry. In this case, the method of functioning of the control device 11 is determined by means of the circuitry thereof. However, the control device 11 is generally embodied as a software-programmable control device 11. In this case, the method of functioning of the control device 11 is determined by a computer program 12 with which the control device 11 is programmed.

The computer program 12 comprises a machine code 13 which can be processed directly by the control device 11. The processing of the machine code 13 by the control device 11 causes the control device 11 to carry out an operating method which is determined by the machine code 13.

The computer program 12 can be fed to the control device 11 in any desired way. For example, the computer program 12 can already be stored in the control device 11 when the control device 11 is manufactured. Alternatively, it is possible for the computer program 12 to be fed to the control device 11 via a computer network—for example the World Wide Web. It is, in turn, alternatively possible for the computer program 12 to be stored on a mobile data carrier 14 in a machine-readable form and to be fed to the control device 11 in this way. The mobile data carrier 14 can be embodied according to requirements. Purely by way of example, a USB memory stick is illustrated schematically in FIG. 1. Alternatively, the mobile data carrier 14 could, for example, be embodied as an SD memory card or as a CD-ROM.

Irrespective of whether the control device 11 is embodied by circuitry or carries out the computer program 12, the control device 11 implements an operating method which will be explained in more detail below in conjunction with FIG. 2.

Figure 2:
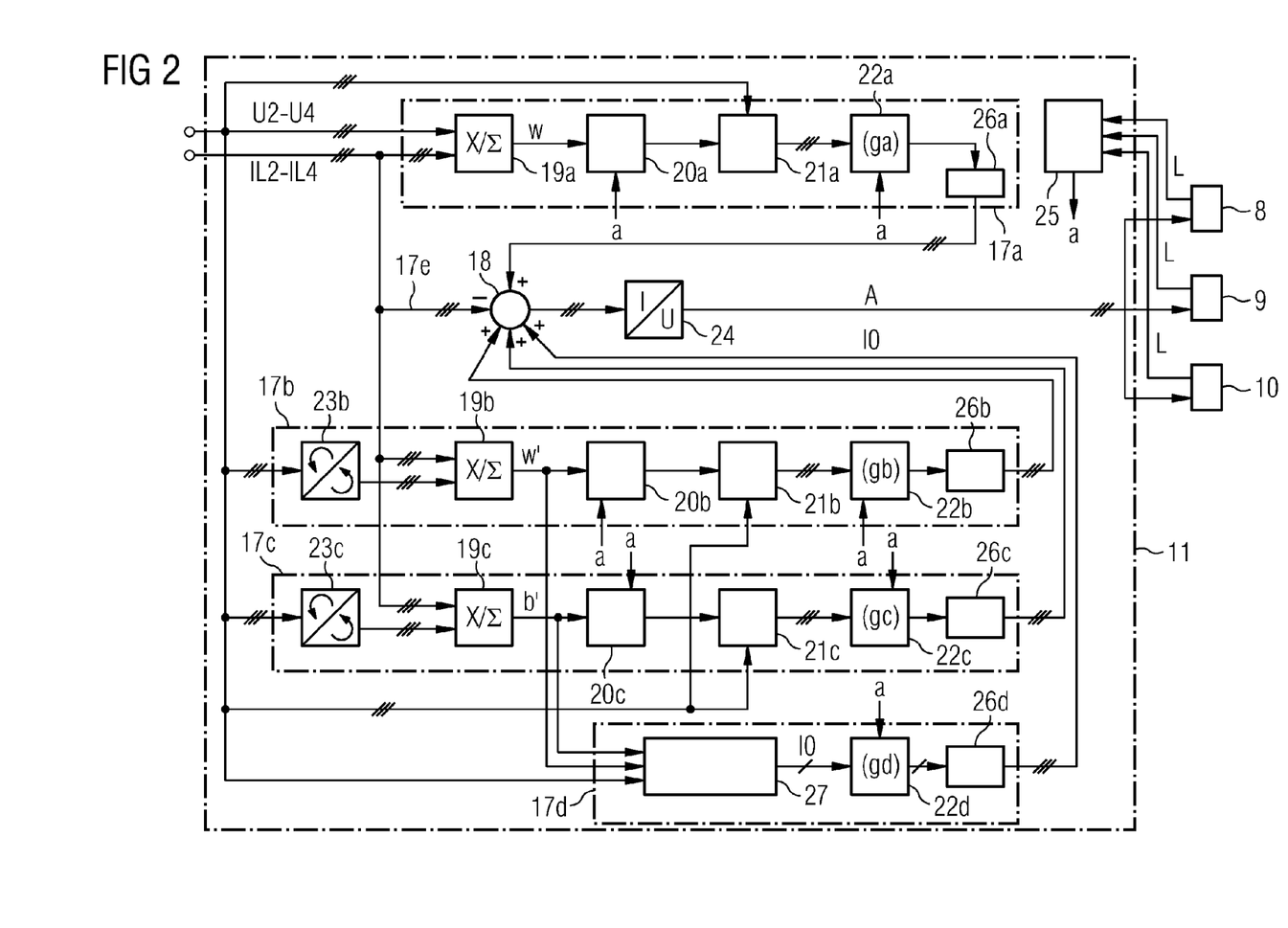
FIG. 2 shows an operating method for a multilevel converter.

According to FIG. 2, phase voltage values U2 to U4 and phase current values IL2 to IL4 are fed to the control device 11. The phase voltage values U2 to U4 are characteristic of the phase voltages which are present at the phases 2 to 4. They can be tapped, for example, by means of corresponding voltage sensors 15. In principle, the tapping can occur at any desired location on the three-phase network 1. The tapping preferably takes place in the vicinity of the feeding point 5. The phase current values IL2 to IL4 are characteristic of the phase currents flowing in the phases 2 to 4. They can be detected, for example, by means of corresponding current sensors 16. The current sensors 16 are preferably arranged in that part of the three-phase network 1 by which the load 6 is exclusively supplied. According to the illustration in FIGS. 1 and 2, the phase voltage values U2 to U4 and the phase current values IL2 to IL4 are fed directly to the control device 11. However, it is alternatively possible for the phase voltage values U2 to U4 and the phase current values IL2 to IL4 to be converted into an orthogonal two-component system. This conversion is generally known to a person skilled in the art and therefore does not need to be explained in more detail.

The control device 11 implements at least five signal paths 17 which all open into a common node 18. The signal paths 17 are specified below with, in each case, one of the letters a to e in order to differentiate them from one another. The respective same letter a to e is also used, where appropriate, as a supplement to the individual elements of the respective signal paths 17.

In the first signal path 17a, the phase voltage values U2 to U4 are multiplied on a component basis by the respectively corresponding phase current value IL2 to IL4 in a linking block 19a (implied: in what is referred to as the positive phase-sequence system). Furthermore, the sum of the products is determined. The output signal of the linking block 19a is an active component w. The active component w is a scalar variable which is characteristic of the total active current flowing in the three-phase network 1.

If, for example, the phase voltage values U2 to U4 and the phase current values 12 to 14 are converted into an orthogonal two-component system, and in the two-component system the phase voltage values there are denoted by u1, u2 and the phase current values there by i1, i2, the active component w is obtained as w=u1·i1+u2·2.

The active component w is filtered in a filter 20a with a filter characteristic. As a rule, low-pass filtering takes place. However, other filter characteristics are also possible and conceivable, for example bandpass filtering or bandpass rejection filtering.

The filtered active component w is fed to a multiplication block 21a, to which the phase voltage values U2 to U4 are also fed. The phase voltage values U2 to U4 are multiplied by the filtered active component w in the multiplication block 21a. The phase voltage values U2 to U4 which are multiplied by the filtered active component w are fed to the node 18 via a weighting block 22a. Weighting by a weighting factor ga takes place in the weighting block 22a.

Optionally, an adaptation filter 26a can be assigned downstream of the weighting block 22a. If the adaptation filter 26a is present, it carries out filtering which has an integrating behavior in the vicinity of the network frequency (usually 50 Hz or 60 Hz).

The second signal path 17b has a similar structure to the first signal path 17a. However, in contrast to the first signal path 17a a rotational direction inverter 23b is assigned upstream of the processing block 19b of the second signal path 17b. The rotational direction inverter 23b inverts the rotational direction of the phase voltage values U2 to U4.

What is referred to as the negative phase-sequence system is therefore determined. The output signal w' of the linking block 19b therefore corresponds to a virtual active component w'. This is also a scalar variable. It corresponds to a virtual active power with respect to the inverted three-phase network 1. In the orthogonal two-component system described above, the virtual active component w' would be obtained, for example, as w'=u1·i1−u2·2.

The third signal path 17c has a similar structure to the second signal path 17b. The rotational direction inverter 23c can be, if appropriate, that of the second signal path 17b. The difference between the third signal path 17c and the second signal path 17b is the way in which the linking takes place in the linking block 19c of the third signal path 17c. This is because the output signal b' of the third linking block 19c corresponds to a virtual reactive power, with respect to the inverted three-phase network 1. In the orthogonal two-component system described above, the output signal b' would be obtained, for example, as b'=u1·2+u2·i1.

The two output signals w', b' of the second and third linking blocks 19b, 19c are asymmetrical components. They are characteristic of a distribution, among the phases 2 to 4, of the three-phase network 1, of the total active and reactive currents flowing in the three-phase network 1.

The fourth signal path 17d has a symmetrizing block 27. The asymmetrical components w', b' and the phase voltage values U2 to U4 are fed to the symmetrizing block 27. The symmetrizing block 27 determines a zero current I0, which is also fed to the node 18. The zero current I0 is the same for all the phases 2 to 4. It is determined in such a way that it symmetrizes any asymmetrical active power flux of the multilevel converter 7 which would occur without the zero current I0. In particular, the zero current I0 would be obtained in the orthogonal two-component system described above as $$I0 = \frac{2}{\sqrt{3}} \cdot \frac{u1 \cdot b' + u2 \cdot w'}{u1^2 + u2^2}$$

The configuration of the symmetrizing block 27 is known per se to persons skilled in the art. Said configuration is known, for example, in a static form as a so-called Steinmetz circuit. Purely by way of example, reference is made to the specialist paper "Koordinatentransformationen für Mehrgrößen-Regelsysteme zur Kompensation and Symmetrierung von Drehstromnetzen [Coordinate transformations for multi-variable control systems for compensating and symmetrizing three-phase networks]" by W. Meusel and H. Waldmann, Siemens Forsch.-u. Entwickl.-Ber., Vol. 6 (1997), No. 1, pages 29 to 38, Springer-Verlag 1977.

The phase current values IL2 to IL4 are fed to the node 18 via the fifth signal path 17e. However, in contrast to the other values fed to the node 18, the phase current values IL2 to IL4 are fed to the node 18 with a negative sign.

At the node 18, the signals which are fed to the node 18 are summed on a component by component basis—that is to say separately for each phase 2 to 4. The output signal of the node 18 corresponds to a set point current request for the individual converter phases 8 to 10 of the multilevel converter 7. Said output signal is fed to a converter 24 which determines therefrom the necessary voltage values of the converter phases 8 to 10. The voltage values correspond in their totality to a set point actuation state of the converter phases 8 to 10. Said voltage values are fed to the converter phases 8 to 10, with the result that the latter are correspondingly actuated. The determination of the set point actuation state for a given set point current request is known to a person skilled in the art. Said determination can take place in the same way as in document U.S. Pat. No. 6,075,350 A, mentioned at the beginning.

On the basis of the formation of sums at the node 18 on a component by component basis, the set point current request is determined for the individual converter phases 8 to 10 of the multilevel converter 7 in such a way that not only harmonics and reactive power components are compensated but, furthermore, the active power is also distributed uniformly among the phases 2 to 4 of the three-phase network 1.

The filter characteristics of the filters 20a to 20c can be determined independently of one another. As a rule, the filter characteristics of the filters 20b and 20c are the same as one another. The filter characteristics of the filters 20b, 20c for the asymmetrical components w', b' are preferably determined in such a way that they enhance a reduction in flickering, which already occurs even without the filtering. The corresponding configuration of the filter is known to a person skilled in the art. For example, the filters 20a to 20c can contain, as an alternative to or (preferably) in addition to, low-pass filtering, a characteristic which is inverse with respect to the eye sensitivity curve which is known to a person skilled in the art. The filter characteristic of the filter 20a for the active component w' can be determined in the same way as the filter characteristics for the filters 20b, 20c. Alternatively, they can be different from the filter characteristic of the filters 20b, 20c. As a result, in particular independent optimization of a charge state L of the multilevel converter 7 from the distribution of the charge state L among the individual converter phases 8 to 10 is possible.

In an additional configuration of various embodiments it is also possible to feed information about the charge state L of the converter phases 8 to 10 to the control device 11. In this case, the charge state L can be evaluated, for example, in an evaluation block 25. Within the scope of this evaluation it is possible for an adaptation factor a to be determined, for example, uniformly for the filters 20a to 20c and/or the weighting blocks 22a to 22c or else independently for each of these components 20a to 20c, 22a to 22c. The filter characteristics of the filters 20a to 20c and/or of the weighting factors ga to gc can be adapted on the basis of the adaptation factor a.

It is possible to determine a separate adaptation factor a for each of the filters 20a to 20c and for each of the weighting blocks 22a to 22c. Alternatively it is possible for the adaptation factor a to act only on individual components of the components 20a to 20c, 22a to 22c. It is also possible for the adaptation factor a to act on a plurality of the components 20a to 20c, 22a to 22c in the same way or in a different way. The effect can be stepless or graduated, with or without hysteresis. Switching over between different filter coefficients, parameter sets, etc., is also possible.

The configuration explained above is completely sufficient if the number of phases 2 to 4 of the three-phase network 1 is exactly three. If the number of phases 2 to 4 of the three-phase network 1 is greater than three, for example five, it may be necessary to determine further asymmetrical components. In this case, a corresponding further signal path 17 must be present, in addition to the signal paths 17a to 17e, for each further asymmetrical component which is to be determined. The configuration of the corresponding further signal paths is similar to that of the signal paths 17b and 17c.

The various embodiments have many advantages. In particular, simple, robust, reliable and rapid control of the multilevel converter 7 takes place, wherein "unsteady" and asymmetrical loads are reduced to a slight flickering effect. The procedure according to various embodiments brings about very rapid compensation with simultaneous avoidance of overdriving in the multilevel converter 7. Furthermore, symmetrical loading of the three-phase network 1 takes place. The charge state L of the multilevel converter 7 can also be taken into account. The computational methods which are necessary for this are familiar to persons skilled in the art and they are therefore easy to implement.

The above description serves exclusively to explain the various embodiments. On the other hand, the scope of protection of the present invention is to be determined exclusively by the appended claims.

What is claimed is:

1. An operating method for a multilevel converter which has a number of converter phases which are connected to the phases of a three-phase network in a star or delta connection, comprising:
   determining an active component and at least two asymmetrical components on the basis of phase voltage values and phase current values,
   wherein the phase voltage values are characteristic of the phase voltages present at the phases and the phase current values are characteristic of the phase currents flowing in the phases,
   wherein the active component is characteristic of the total active current flowing in the three-phase network and the at least two asymmetrical components are characteristic of a distribution, among the phases, of the total active and reactive currents flowing,
   filtering the active component and the at least two asymmetrical components with one filter characteristic each,
   multiplying each of the phase voltage values by the filtered active component and the at least two filtered asymmetrical components,
   multiplying the multiplied phase voltage values by a respective weighting factor and then adding them to the phase current values,
   determining a zero current on the basis of the asymmetrical components and the phase voltage values and adding the zero current to the phase current values, wherein the zero current is determined in such a way that it symmetrizes any asymmetrical active power flux of the multilevel converter which would occur without the zero current, and
   determining an actuation state for the converter phases on the basis of the phase current values which are modified in such a way, and actuating the converter phases in accordance with the determined actuation state.

2. The operating method according to claim 1, wherein the filter characteristics for the at least two asymmetrical components are determined in such a way that a reduction in flickering, which occurs even without the filtering, is enhanced.

3. The operating method according to claim 1, wherein the filter characteristics for the at least two asymmetrical components differ from the filter characteristic for the active component.

4. The operating method according to claim 1, wherein at least one adaptation factor is determined on the basis of an instantaneous charge state of the converter phases, on the basis of which adaptation factor at least one of: at least one of the filter characteristics and at least one of the weighting factors is adapted.

5. The operating method according to claim 1, wherein at least one of at least one of the multiplied phase voltage values and the zero current is filtered before the addition to the phase current values by means of a respective adaptation filter which has an integrating behavior in the vicinity of the network frequency.

6. A computer program product comprising a computer readable medium storing machine code which can be processed directly by a control device for the converter phases of a multilevel converter and the processing of which by the control device and which causes the control device
   to determine an active component and at least two asymmetrical components on the basis of phase voltage values and phase current values, wherein the phase voltage values are characteristic of the phase voltages present at the phases and the phase current values are characteristic of the phase currents flowing in the phases, wherein the active component is characteristic of the total active current flowing in the three-phase network, and the at least two asymmetrical components are characteristic of a distribution, among the phases, of the total active and reactive currents flowing,
   to filter the active component and the at least two asymmetrical components with one filter characteristic each,
   to multiply each of the phase voltage values by the filtered active component and the at least two filtered asymmetrical components,
   to multiply the multiplied phase voltage values each by a respective weighting factor and then to add them to the phase current values,
   to determine a zero current on the basis of the asymmetrical components and the phase voltage values and to add the zero current to the phase current values, wherein the zero current is determined in such a way that it symmetrizes any asymmetrical active power flux of the multilevel converter which would occur without the zero current, and
   to determine an actuation state for the converter phases on the basis of the phase current values which are modified in such a way, and to actuate the converter phases in accordance with the determined actuation state.

7. The computer program according to claim 6, wherein the filter characteristics for the at least two asymmetrical components are determined in such a way that a reduction in flickering, which occurs even without the filtering, is enhanced.

8. A control device for a number of converter phases of a multilevel converter which are connected to the phases of a three-phase network in a star or delta connection, wherein the control device is embodied in such a way that during operation it
   determines an active component and at least two asymmetrical components on the basis of phase voltage values and phase current values, wherein the phase voltage values are characteristic of the phase voltages present at the phases and the phase current values are characteristic of the phase currents flowing in the phases, wherein the active component is characteristic of the total active current flowing in the three-phase network, and the at least two asymmetrical components are characteristic of a distribution, among the phases, of the total active and reactive currents flowing,
   filters the active component and the at least two asymmetrical components with one filter characteristic each,
   multiplies each of the phase voltage values by the filtered active component and the at least two filtered asymmetrical components,
   multiplies the multiplied phase voltage values each by a respective weighting factor and then adds them to the phase current values, determines a zero current on the basis of the asymmetrical components and the phase voltage values and adds the zero current to the phase current values, wherein the zero current is determined in such a way that it symmetrizes any asymmetrical active power flux of the multilevel converter which would occur without the zero current, and determines an actuation state for the converter phases on the basis of the phase current values which are modified in such a way, and actuates the converter phases in accordance with the determined actuation state.

9. The control device according to claim 8, wherein the control device is embodied as a software-programmable control device.

10. A multilevel converter comprising a control device according to claim 8, wherein the multilevel converter has a number of converter phases which are connected to the phases of a three-phase network in a star or delta connection.

11. The computer program according to claim 6, wherein the filter characteristics for the at least two asymmetrical components differ from the filter characteristic for the active component.

12. The computer program according to claim 6, wherein at least one adaptation factor is determined on the basis of an instantaneous charge state of the converter phases, on the basis of which adaptation factor at least one of: at least one of the filter characteristics and at least one of the weighting factors is adapted.

13. The computer program according to claim 6, wherein at least one of at least one of the multiplied phase voltage values and the zero current is filtered before the addition to the phase current values by means of a respective adaptation filter which has an integrating behavior in the vicinity of the network frequency.

14. The control device according to claim 8, wherein the filter characteristics for the at least two asymmetrical components are determined in such a way that a reduction in flickering, which occurs even without the filtering, is enhanced.

15. The control device according to claim 8, wherein the filter characteristics for the at least two asymmetrical components differ from the filter characteristic for the active component.

16. The control device according to claim 8, wherein at least one adaptation factor is determined on the basis of an instantaneous charge state of the converter phases, on the basis of which adaptation factor at least one of: at least one of the filter characteristics and at least one of the weighting factors is adapted.

17. The control device according to claim 8, wherein at least one of at least one of the multiplied phase voltage values and the zero current is filtered before the addition to the phase current values by means of a respective adaptation filter which has an integrating behavior in the vicinity of the network frequency.

* * * * *

UNITED STATES PATENT AND TRADEMARK OFFICE
CERTIFICATE OF CORRECTION

PATENT NO. : 8,653,799 B2  Page 1 of 1
APPLICATION NO. : 13/141795
DATED : February 18, 2014
INVENTOR(S) : Wolfgang Hörger et al.

It is certified that error appears in the above-identified patent and that said Letters Patent is hereby corrected as shown below:

On the Title Page, Item (54) and in the Specification, Column 1, line 1, Title, "MULTILEVEL CONVERTER AS REACTIVE POWER COMPENSATOR HAVING ACTIVE" should read -- MULTILEVEL CONVERTER AS REACTIVE POWER COMPENSATOR HAVING ACTIVE POWER SYMMETRIZATION --.

Signed and Sealed this
Ninth Day of September, 2014

Michelle K. Lee
*Deputy Director of the United States Patent and Trademark Office*